Patented May 27, 1952

2,597,842

UNITED STATES PATENT OFFICE 2,597,842

CYCLIC CARBINOLS

Carl B. Linn, Riverside, Ill., assignor to Universal Oil Products Company, Chicago, Ill., a corporation of Delaware No Drawing. Application May 9, 1950,
Serial No. 161,011

9 Claims. (Cl. 260—617)

This invention relates to a new and useful class of alcohols and to a process for preparing them.

An object of this invention is to provide a novel class of cyclic alcohols also referred to as cyclic carbinols which are adapted for use as intermediates in organic synthesis, and particularly in the production of esters of organic and inorganic acids, in the production of halides by replacing the carbinol hydroxyl group with halogen and in the oxidation of such secondary cyclic carbinols to ketones.

One specific embodiment of this invention is a carbinol having the structural formula

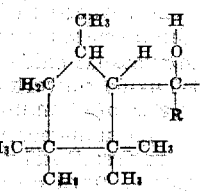

wherein R represents a member of the group consisting of hydrogen and an alkyl group and $R^1$ represents a member of the group consisting of an alkyl group, a cycloalkyl group, and an aryl group.

Another embodiment of this invention relates to a methyl carbinol having combined with the carbinol group a cyclopentyl ring with two adjacent nuclear carbon atoms combined with geminal methyl groups.

A further embodiment of this invention is 1-(2',2',3',3',5' - pentamethylcyclopentyl) - ethanol-1.

A still further embodiment of this invention is 2-(2',2',3',3',5' - pentamethylcyclopentyl) - propanol-2.

I have found that desoxymesityl oxide with the formula

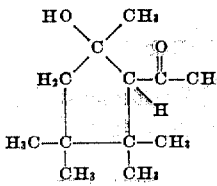

is a convenient starting material for the production of cyclic alcohols containing a cyclopentyl ring in which two adjacent nuclear carbon atoms are combined with geminal methyl groups, that is, each of these adjacent nuclear carbon atoms is combined with two methyl groups. Such polymethylated cyclopentyl compounds may also contain an additional methyl group combined with another nuclear carbon atom that is adjacent to the nuclear carbon atom which is combined with the carbinol group. Such carbinols also contain either one or two methyl groups combined with the carbinol group. Thus a methyl (pentamethylcyclopentyl) carbinol is obtained by utilizing desoxymesityl oxide as a starting material which is dehydrated by fractional distillation at a subatmospheric pressure to form a pentamethylcyclopentenylmethyl ketone which is then reduced catalytically with hydrogen to form a carbinol of this invention, namely, 1 - (2',2',3',3',5' - pentamethylcyclopentyl)-ethanol-1. This hydrogenation treatment of the pentamethylcyclopentenylmethyl ketone is carried out, for example, at a temperature of from about 10° to about 75° C. and preferably at a temperature of from about 25° to about 50° C. in the presence of an active hydrogenation catalyst, such as reduced nickel supported by diatomaceous earth. Other catalysts which may be utilized in the process include platinum, platinum supported by alumina (as 5% by weight pt. content), platinum on silica, platinum on activated charcoal, and the like. Other suitable hydrogenation catalysts include compounds and particularly an oxide of a metal selected from the members of the left-hand columns of groups IV, V and VI of the periodic table. Of these oxide catalysts, chromia-alumina and alumina-molybdic oxide are particularly effective although not at the same conditions of operation as utilized with other catalysts mentioned above such as catalysts containing platinum and/or nickel.

Desoxymesityl oxide used as a starting material in this process for producing the above-indicated pentamethylcyclopentenylmethyl carbinols is produced by reacting mesityl oxide with an aluminum-mercury couple in wet ether solution whereby a condensation occurs which may be represented by the following equation:

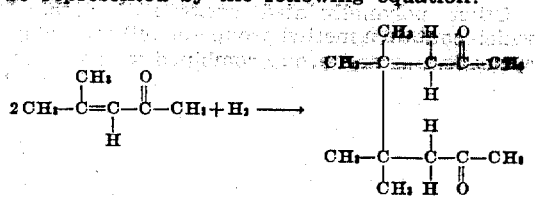

The resultant di-ketone apparently undergoes an internal aldol condensation to give desoxymesityl oxide which is represented by the formula:

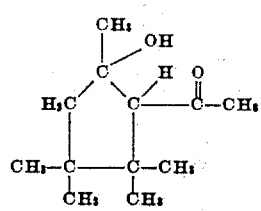

The desoxymesityl oxide which is a tertiaryalcohol loses water readily when fractionally distilled at reduced pressure and yields an unsaturated ketone which is represented by the structure

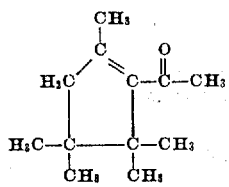

As aforementioned, catalytic hydrogenation of the unsaturated ketone converts it into a saturated alcohol of the formula

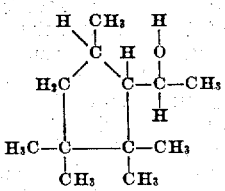

which may also be referred to as 1-(2',2',3',3',5'-pentamethylcyclopentyl)-ethanol-1.

A homolog of this polymethylated cyclopentyl carbinol which contains two methyl groups combined with the carbinol group is produced by reacting the dehydration product of desoxymesityl oxide with methylmagnesium bromide to form an unsaturated carbinol having two methyl groups combined with the carbon atom of the carbinol group and also having a double bond in the 5-membered ring which is also combined with five methyl groups. The resultant pentamethylcyclopentenyldimethyl carbinol is hydrogenated catalytically at mild conditions to form 2-(pentamethylcyclopentyl)-propanol-2 having the formula:

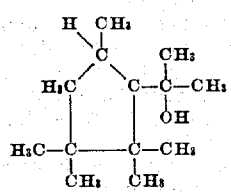

Other polymethylated cyclopentyl carbinols which contain a methyl group and either in alkyl, cycloalkyl, or aryl group combined with the carbinol group are produced by reacting the dehydration product of desoxymesityl oxide with RMgBr in which R represents an alkyl, cycloalkyl, or aryl group to form an unsaturated carbinol having geminal hydrocarbon groups combined with the carbon atom of the carbinol group and having a double bond in the 5-membered ring which is also combined with five methyl groups. The resultant pentamethylcyclopentenylmethyl-R-carbinol is hydrogenated catalytically at mild conditions to form a carbinol having the formula:

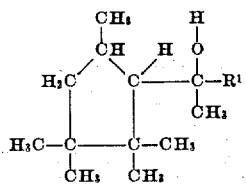

wherein $R^1$ represents a member of the group consisting of an alkyl group, a cycloalkyl group, and an aryl group.

The nature of the present invention is illustrated further by the following example which should not be misconstrued to limit unduly the generally broad scope of the invention.

Mesityl oxide was reduced in wet ether solution by an aluminum-mercury couple to give a 60% yield of desoxymesityl oxide based upon the amount of mesityl oxide converted. In a typical preparation 200 grams of aluminum foil was converted into the aluminum-mercury couple following the procedure described by Vogel, J. Chem. Soc. 130, 594, (1927). This aluminum-mercury couple was then placed in a 5-liter flask provided with a large reflux condenser and containing about 2 liters of ether saturated with water. To this mixture in the 5-liter flask, 200 grams of mesityl oxide was then added. With an active aluminum-mercury couple, reaction began in a few minutes and reached a maximum in an hour or so and then gradually subsided after which about 100 grams of water was added while the vigorous boiling action continued in the reaction flask. After standing overnight, the ether was filtered from the solid which remained in the flask, was dried over calcium chloride and then distilled at atmospheric pressure to separate ether from the product, comprising essentially desoxymesityl oxide. A general summary of the production of desoxymesityl oxide is given in Table I.

TABLE I

*Reduction of mesityl oxide with aluminum-mercury couple*

| Run | 8 | 12 | 14 | 16 | 18 |
|---|---|---|---|---|---|
| Charge: | | | | | |
| Aluminum used in preparing couple, grams | 200 | 210+200 | 220 | 306+150 | 300+300 |
| Ether, liters | 2.7 | 3 | 3 | 4 | 4 |
| Mesityl Oxide, grams | 202 | 210 | 225 | 306 | 300 |
| Water added, grams | 180 | 200+150 | 200 | 250 | 250 |
| Recovery: | | | | | |
| Ether-free Product, grams | 190 | 175 | 195 | 300 | 295 |
| B. P. near mesityl oxide, grams | 43.5 | 118 | 123 | 86 | 49 |
| B. P. greater than mesityl oxide, grams | 146.5 | 52 | 72 | 214 | 246 |
| Loss, grams | 12 | 35 | 30 | 6 | 5 |

Fractional distillation of the desoxymesityl oxide was accompanied by loss of weight at a temperature of about 150° which resulted in the formation of an olefinic ketone (B) which has probably a mixture of isomers with the olefinic double bond located at different positions in the 5-membered ring of the pentamethylcyclopentenylmethyl ketone.

A portion of this olefinic ketone (B) was then subjected to catalytic hydrogenation in the presence of a nickel-diatomaceous earth catalyst containing about 60% by weight of freshly reduced nickel. The results obtained in these hydrogenations runs at temperatures of 25° and 75° C. are indicated in Table II.

TABLE II

| Runs | 1 | 2 |
|---|---|---|
| Vol. Bomb. ml | 128 | 450 |
| Grams (B) charged | 10 | 37 |
| n-Pentane ml | 220 | 33 |
| Grams Ni catalyst | 1 | 5 |
| Initial Hydrogen Pressure, Atm | 100 | 100 |
| Temperature, °C | 25 | 75 |
| Hours | 14 | 4 |
| Hydrogen absorbed, Mols, per mol (B) | 2.0 | 2.2 |

DISTILLATION OF PRODUCT FROM RUN 1

| Cut | B. P.$_{750}$ °C. | Weight Percent | $n_D^{20}$ |
|---|---|---|---|
| 1 | 215–216 | 15 | 1.4543 |
| 2 | 217 | 30 | 1.4543 |
| 3 | 218 | 17 | 1.4544 |
| 4 | 219 | 18 | 1.4548 |
| Bottoms | | 20 | 1.4567 |

DISTILLATION OF PRODUCT FROM RUN 2

| Cut | B. P.$_{14}$ °C | Calc. B. P.$_{750}$ °C. | Weight Percent | $n_D^{20}$ | $D_4^{20}$ |
|---|---|---|---|---|---|
| 1 | 82–96 | 211 | 11 | 1.4478 | |
| 2 | 96–101 | 211–217 | 24 | 1.4529 | |
| 3 | 101–104 | 217–220 | 23 | 1.4535 | 0.860 |
| 4 | 104–109 | 220–226 | 16 | 1.4580 | |

ELEMENTARY ANALYSIS

| | Found for | | Calc. for $C_{12}H_{24}O$ |
|---|---|---|---|
| | Run 1, Cut 2 | Run 2, Cut 3 | |
| Percent C | 78.50 | 78.68 | 78.19 |
| Percent H | 12.74 | 13.13 | 13.13 |

Infrared analysis of the resultant hydrogenated product boiling between 215° and 220° C. at 760 mm. pressure showed it to contain an hydroxyl group and in general to be in agreement with values expected for a carbinol with the structure

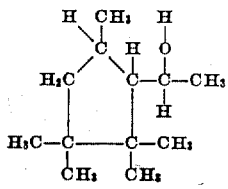

Accordingly, at low temperatures catalytic hydrogenation of the unsaturated dehydrogenation product of desoxymesityl oxide saturated the double bond and also reduces the carbinol group to an hydroxyl group, giving a carbinol with the structure shown above.

I claim as my invention:

1. A carbinol having the structural formula

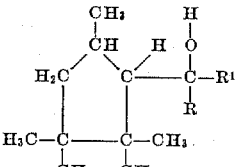

wherein R represents a member of the group consisting of hydrogen and an alkyl group and $R^1$ represents a member of the group consisting of an alkyl group, a cycloalkyl group, and an aryl group.

2. A carbinol as defined in claim 1 further characterized in that $R^1$ represents an alkyl group.

3. A methyl carbinol having combined with the carbinol group a cyclopentyl ring with two adjacent nuclear carbon atoms combined with geminal methyl groups.

4. A methyl carbinol as defined in claim 3 further characterized in that said cyclopentyl ring has a methyl substituent at the 5-position and is unsubstituted at the 4-position.

5. 1-(2',2',3',3',5'-pentamethylcyclopentyl)-ethanol-1.

6. 2-(2',2',3',3',5'-pentamethylcyclopentyl)-propanol-2.

7. A process for producing 1-(2',2',3',3',5'-pentamethylcyclopentyl)-ethanol-1 which comprises hydrogenating 2',2',3',3',5' pentamethylcyclopentenylmethyl ketone at a temperature of from about 10° to about 75° C. in the presence of a hydrogenation catalyst to form 1-(2',2',3',3',5'-pentamethylcyclopentyl)-ethanol-1.

8. A process which comprises hydrogenating 2',2',3',3',5'-pentamethylcyclopentenylmethyl ketone in the presence of a nickel catalyst at a temperature of from about 10° to about 75° C. and recovering the resultant 1-(2',2',3',3',5'-pentamethylcyclopentyl)-ethanol-1.

9. A carbinol having at least two carbon atoms in its carbinol group and having attached to one of said carbon atoms a 2',2',3',3',5'-pentamethylcyclopentenyl group.

CARL B. LINN.

REFERENCES CITED

The following references are of record in the file of this patent:

UNITED STATES PATENTS

| Number | Name | Date |
|---|---|---|
| 2,435,403 | Morris et al. | Feb. 3, 1948 |